(Model.)
L. RÖSSLER.
SCREW CONVEYER.
No. 376,552. Patented Jan. 17, 1888.
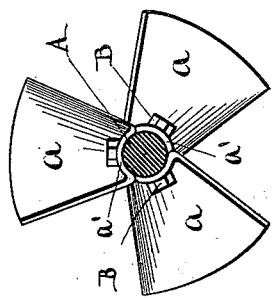
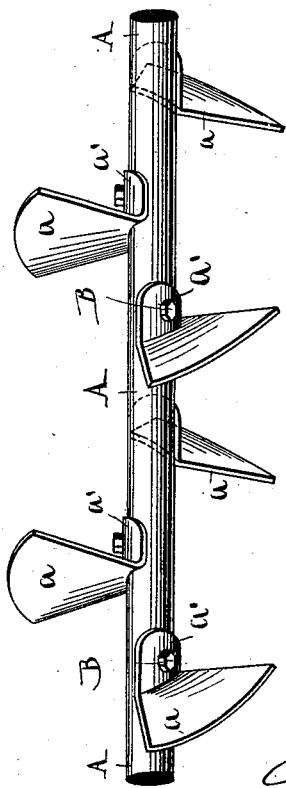
WITNESSES:
INVENTOR
Ludwig Rössler
BY Goepel & Raegener
ATTORNEYS.

UNITED STATES PATENT OFFICE.

LUDWIG RÖSSLER, OF AIBLING, BAVARIA, GERMANY.

SCREW CONVEYER.

SPECIFICATION forming part of Letters Patent No. 376,552, dated January 17, 1888.

Application filed March 11, 1887. Serial No. 230,498. (Model.) Patented in France March 9, 1887, No. 182,074; in Belgium March 9, 1887, No. 76,623; in Italy March 31, 1887, No. 21,309; in Luxemburg April 21, 1887, No. 836, and in Austria-Hungary June 16, 1887, No. 10,400 and No. 78,086.

*To all whom it may concern:*

Be it known that I, LUDWIG RÖSSLER, of Aibling, in the Kingdom of Bavaria and Empire of Germany, have invented certain new and useful Improvements in Screw Conveyers, of which the following is a specification.

The object of my invention is to provide a new and improved screw conveyer which has the advantage of being light and at the same time strong and durable, and which can be repaired without removing any other but the broken parts.

The invention consists in the construction and combination of parts, as will be fully described and set forth hereinafter, and then pointed out in the claim.

In the accompanying drawings, Figure 1 is a perspective view of a part of my improved screw conveyer. Fig. 2 is a cross-sectional view of the same.

Similar letters of reference indicate corresponding parts.

The conveyer is composed of a series of sector-shaped wings, $a$, made of sheet metal, the inner or narrowest ends of which are gradually bent over to form flanges $a'$, which are segmental in cross-section, so as to fit snugly upon the shaft A. The wings are not curved, but remain entirely flat, the flanges $a'$ projecting at an angle from the sector-shaped wing— that is to say, the vertical longitudinal plane of the flange of the wing does not meet the plane of the wing at right angles, but at one side of the wing an acute angle is formed, and at the other side an obtuse angle is formed. The flanges are then fastened on the said shaft, which may be circular or square in cross-section, by means of bolts B. The planes of the several wings will be at an angle to the longitudinal planes of the shaft, and it is evident that the several wings project in different directions, so as to complete the line of the spiral, as shown in Fig. 2. In case any wing becomes broken, it can be detached very easily and rapidly replaced by a new one without detaching the remaining wings. The wings are very strong, durable, and light.

Having thus described my invention, I claim as new and desire to secure by Letters Patent—

In a screw conveyer, the combination, with a shaft, of a series of sector-shaped wings having their narrower ends bent over to form segmental flanges of the diameter of the shaft, and bolts passed through said flanges into the shaft, the plane of each wing being at an angle to the vertical longitudinal plane of its flange, substantially as shown and described.

In testimony that I claim the foregoing as my invention I have signed my name in presence of two subscribing witnesses.

LUDWIG RÖSSLER.

Witnesses:
HCH. REINHARD,
G. DEDREUX.